United States Patent
Leland

(10) Patent No.: US 9,682,517 B2
(45) Date of Patent: Jun. 20, 2017

(54) SANDWICH PANEL JOINT ASSEMBLY FOR A WIND TURBINE

(71) Applicant: General Electric Company, Schenectady, NY (US)

(72) Inventor: Kenneth Bradley Leland, Greer, SC (US)

(73) Assignee: General Electric Company, Schenectady, NY (US)

( * ) Notice: Subject to any disclaimer, the term of this patent is extended or adjusted under 35 U.S.C. 154(b) by 587 days.

(21) Appl. No.: 14/210,735

(22) Filed: Mar. 14, 2014

(65) Prior Publication Data

US 2015/0258741 A1    Sep. 17, 2015

(51) Int. Cl.

| | |
|---|---|
| *B29C 70/44* | (2006.01) |
| *F01D 25/24* | (2006.01) |
| *F03D 1/06* | (2006.01) |
| *B29C 70/68* | (2006.01) |
| *B29K 309/08* | (2006.01) |
| *B29L 31/08* | (2006.01) |

(52) U.S. Cl.
CPC .......... *B29C 70/443* (2013.01); *B29C 70/682* (2013.01); *F01D 25/243* (2013.01); *F03D 1/0675* (2013.01); *B29K 2309/08* (2013.01); *B29L 2031/085* (2013.01); *Y02P 70/523* (2015.11)

(58) Field of Classification Search
CPC ... B29C 70/443; B29C 70/682; F03D 1/0675; F01D 25/243
See application file for complete search history.

(56) References Cited

U.S. PATENT DOCUMENTS

| | | | |
|---|---|---|---|
| 3,392,225 A | 7/1968 | Phelan | |
| 3,621,557 A | 11/1971 | Cushman et al. | |
| 5,240,543 A | 8/1993 | Fetterhoff et al. | |
| 7,802,953 B2* | 9/2010 | Stephen | F16B 5/0208 411/246 |
| 9,446,488 B2* | 9/2016 | Coronado | B23P 19/04 |
| 9,492,973 B2* | 11/2016 | Datta et al. | B29C 70/443 |
| 2015/0240780 A1* | 8/2015 | Leonard et al. | F03D 1/0675 416/204 R |

FOREIGN PATENT DOCUMENTS

EP    2 650 534 A1    10/2013

* cited by examiner

*Primary Examiner* — Kevin Lee
(74) *Attorney, Agent, or Firm* — Dority & Manning, P.A.

(57) ABSTRACT

A sandwich panel joint assembly for a nacelle of a wind turbine and method of manufacturing same is disclosed. The method includes forming at least one groove into a core structure. A next step includes inserting at least one fastener element within the groove such that the fastener element is recessed within the core structure. The method also includes placing the core structure containing the fastener element into a mold. A next step includes inserting a resin material into the mold to at least partially surround the core structure, wherein a portion of the fastener element becomes embedded within the resin material. The resin material is then allowed to cure so as to form a plurality of panel members that surround the core structure. As such, the fastener element is recessed within the core structure and molded into one of the cured panel members.

5 Claims, 8 Drawing Sheets

SANDWICH PANEL JOINT ASSEMBLY FOR A WIND TURBINE

FIELD OF THE INVENTION

The present invention relates generally to the field of wind turbines, and more particularly to a sandwich panel joint assembly for joining various components of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor hub having one or more rotor blades connected thereto. The rotor blades capture kinetic energy of wind using known airfoil principles. Further, the rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a utility grid.

Various components of a wind turbine are typically housed within the nacelle. For example, the rotor hub may be coupled to a shaft extending within the nacelle. Further, the gearbox and the generator are typically coupled to the shaft and may be housed within the nacelle. A typical nacelle may include a frame structure having a base, side support walls, and top support members. A plurality of shell panels may be attached to the frame structure to enclose the nacelle. Alternatively, the nacelle may be constructed of a plurality of shell members manufactured using common molding processes such that the frame structure is eliminated.

In addition, the shell members may be manufactured to include a sandwich-panel configuration. Sandwich-structured panels generally include two thin but stiff sheets of material attached to a lightweight but thick core. The manufactured shell members may then be bolted or glued together to form the shell of the nacelle.

It is known in the art to mount and/or bolt sandwich panels together in a variety of ways. For example, one known method includes mounting a top or roof panel to the side panels via one or more L-flanges. The L-flanges, however, require the use of mold inlays during the infusion molding process and therefore increase manufacturing time, expense, and material usage. In addition, the L-flanges protrude within the nacelle, thereby taking up more space.

Another known method for joining the shell panels of the nacelle includes drilling holes into the manufactured sandwich panels and then installing steel plates having welded-on threaded rods. Such sandwich panels are manufactured using resin transfer molding (RTM). Once installed, the threaded rod extends within the nacelle and is free to slide around to a degree until a joining plate and bolts are coupled on the joining sandwich panel. Such joints are sometimes referred to in the art as "Jupiter joints". Like the L-flange joints, Jupiter joints are also labor-intensive and costly and their threaded rods extend within the nacelle, which increase the likelihood of injury. In addition, Jupiter joints are associated with high material costs and require welding to ensure connection reliability between the plate and the threaded rod.

Accordingly, a nacelle having an improved joint design for a sandwich panel would be advantageous. For example, a nacelle having internal connection elements incorporated within the sandwich panels before the panels are molded would be desired.

BRIEF DESCRIPTION OF THE INVENTION

Aspects and advantages of the invention will be set forth in part in the following description, or may be obvious from the description, or may be learned through practice of the invention.

In accordance with aspects of the invention, the present subject matter is directed to a nacelle for a wind turbine. The nacelle includes a base shell member configured for mounting atop a tower of the wind turbine and having a side shell wall, a top shell member configured atop the side shell wall, and a joint assembly coupling the top shell member to the base shell member. The top shell member includes at least one sandwich panel having a plurality of panel members surrounding a core structure. The joint assembly includes at least one female connection element and at least one male connection element. The female connection element is at least partially recessed within the core structure of the top shell member and molded into one of the panel members. Thus, the male connection element engages the female connection element so as to couple the base shell member to the top shell member.

In one embodiment, the female connection element may include a tee or weld nut having a flange and an outwardly extending body, wherein the body has a threaded internal hole. In another embodiment, the joint assembly may further include a support plate recessed within the core structure between the female connection element and one of the panel members. In various embodiments, the support plate may include at least one opening, wherein the body of the female connection element is inserted into the opening of the support plate and through one of the panel members. In additional embodiments, the joint assembly may include one or more L-supports configured with the base shell member and the top shell member so as to provide support to the joint assembly during installation. Such L-supports allow for the alignment and typical fabrication tolerance of the panel members.

In another aspect, a method of manufacturing a sandwich panel particularly useful for joining shell members of a wind turbine is disclosed. The method includes forming at least one groove into a core structure. In one embodiment, the groove may be a recessed pocket within the core structure. A next step includes inserting at least one fastener element within the groove such that the fastener element is recessed within the core structure. The method also includes placing the core structure containing the fastener element into a mold. A next step includes inserting a resin material into the mold to at least partially surround the core structure, wherein a portion of the fastener element becomes embedded within the resin material. The resin material is then allowed to cure so as to form a plurality of panel members that surround the core structure. As such, the manufactured sandwich panel includes the fastener element recessed within the core structure and molded or embedded into one of the cured panels.

In another embodiment, the fastener element may include a female connection element. In a particular embodiment, the female connection element includes a tee nut (or weld nut) that has a flange and an outwardly extending body, wherein the body includes a threaded internal hole or bore.

In an additional embodiment, the method may also include inserting a support plate within the groove of the core structure. Further, the support plate may have at least one opening corresponding to the body of the female connection element, wherein the body is inserted into the opening when the support plate is inserted within the groove.

In a further embodiment, the method may also include installing a cover to the female connection element before the step of inserting a resin material into the mold so as to prevent the resin material from entering the female connection element during insertion of the resin material. For example, in various embodiments, the cover may include at least one of a plastic, threaded fastener, a cap, tape, or similar.

In yet another embodiment, the method may include applying a vacuum to the mold so as to assist with inserting the resin material into the mold. More specifically, in a further embodiment, the method may include covering and sealing the mold with a vacuum bag, applying a vacuum within the vacuum bag so as to assist with inserting the resin material into the mold, and injecting the resin material into the vacuum bag so as to fill the mold.

In still another embodiment, the step of forming at least one groove into the core structure may further include manually cutting the groove and/or machining the groove. More specifically, the step of machining the groove may include utilizing computer numerical control (CNC) machining. In additional embodiments, the core structure may include at least one of a polyethylene terephthalate, polyvinyl chloride, polyurethane, polyisocyanurate, or similar.

In still another aspect, the present subject matter is directed to a sandwich-panel joint assembly, particularly useful for joining shell members of a wind turbine. The joint assembly includes a sandwich panel including a plurality of panel members surrounding a core structure, at least one female connection element and at least one male connection element configured to engage the female connection element so as to couple the sandwich panel to another panel or object. Further, the female connection element is recessed at least partially within a groove of the core structure and molded into at least one of the panel members.

In another embodiment, the female connection element includes a tee or weld nut, having a flange and an outwardly extending body, wherein the body may include a threaded internal hole or bore. The joint assembly may also include a support plate recessed within the groove of the core structure. The support plate typically includes at least one opening, wherein the body of the female connection element is inserted into the opening of the support plate when the support plate is inserted within the groove.

In a further embodiment, the joint assembly may include a rivet configured with the female connection element, the support plate, and one of the outer panel members. In still a further embodiment, the support plate may include a plurality of openings configured to engage a plurality of female connection elements recessed within the core structure. In yet another embodiment, the male connection member may include any of the following: a bolt, a rivet, a dowel pin, or similar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Figure 1:
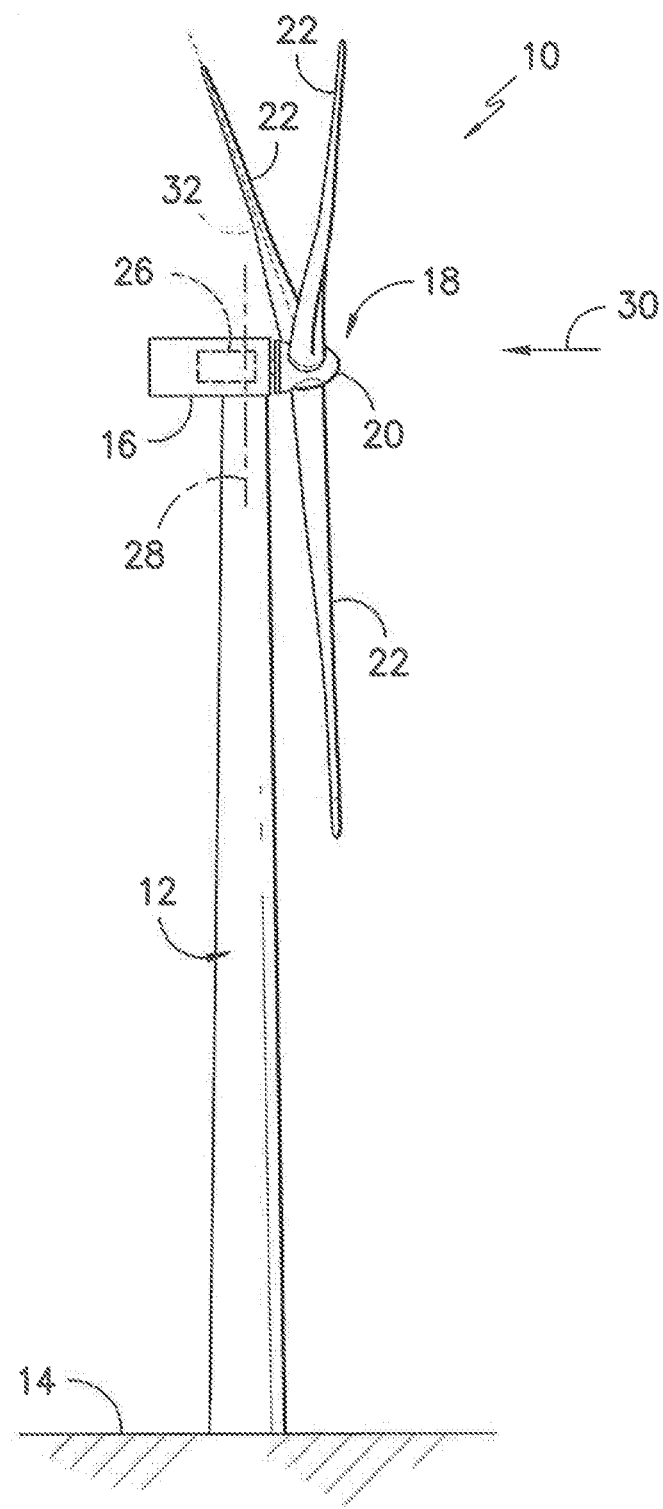
FIG. 1 illustrates a perspective view of a conventional wind turbine and particularly illustrates a nacelle mounted atop of a tower.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present subject matter is directed to a sandwich panel joint assembly for a nacelle of a wind turbine and method of manufacturing same. The nacelle typically includes a base shell member configured for mounting atop a tower of the wind turbine, a top shell member configured atop the base shell member, and a joint assembly coupling the shell members together. The top shell member includes at least one sandwich panel having a plurality of panel members surrounding a core structure. Further, the joint assembly includes an internal female connection element, e.g. a tee nut, recessed within the core structure and molded into one of the panel members and a corresponding male connection element configured to engage the female connection element so as to couple the base shell member to the top shell member.

The method of manufacturing the sandwich panel generally includes forming at least one groove or recessed area into a core structure and inserting a fastener element within the groove such that the fastener element is recessed within the core structure. The core structure is then placed into a mold and a resin material is injected into the mold to at least partially surround the core structure, wherein a portion of the fastener element becomes embedded or molded within the resin material. The resin material is then allowed to cure so as to form a plurality of panel members that surround the core structure. As such, the manufactured sandwich panel includes the fastener element recessed within the core structure and molded into one of the cured panels.

The present disclosure provides many advantages not present in the cited art. For example, the joint assembly provides a strong, internal joint that reduces the risk of injury to workers within the nacelle. Further, in one embodiment, the joint assembly reduces manufacturing costs by molding the fastener element within the panel members to form the joint clamping action without using shop-welded hardware since the tee nut is formed using a punching operation and is formed from a simple plate. Thus, the joint assembly of the present disclosure provides a simple and quick method of coupling shell members together. In addition, the joint assembly of the present disclosure eliminates the need for welding. Still another advantage includes a reduced risk of damage to the nacelle during transportation because of the internal joint components.

Referring now to the drawings, FIG. 1 illustrates a wind turbine 10 of conventional construction. As shown, the wind turbine 10 is a horizontal-axis wind turbine. However, it should be appreciated that the wind turbine 10 may be a vertical-axis wind turbine. In the illustrated embodiment, the wind turbine 10 includes a tower 12 that extends from a support surface 14, a nacelle 16 mounted on the tower 12, and a rotor 18 that is coupled to the nacelle 16. The rotor 18 includes a rotatable hub 20 and at least one rotor blade 22 coupled to and extending outwardly from the hub 20. As shown, the rotor 18 includes three rotor blades 22. However, in an alternative embodiment, the rotor 18 may include more or less than three rotor blades 22. Additionally, in the illustrated embodiment, the tower 12 is fabricated from tubular steel to define a cavity (not illustrated) between the support surface 14 and the nacelle 16. However, in an alternative embodiment, the tower 12 may be any suitable type of tower known in the art.

The rotor blades 22 may generally have any suitable length that enables the wind turbine 10 to function as described herein. For example, in one embodiment, the rotor blades 22 may have a length ranging from about 15 meters (m) to about 91 m. However, other non-limiting examples of blade lengths may include 10 m or less, 20 m, 37 m or a length that is greater than 91 m. Additionally, the rotor blades 22 may be spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 to permit electrical energy to be produced.

As shown in the illustrated embodiment, the wind turbine 10 may also include a turbine control system or turbine controller 26 centralized within the nacelle 16. However, it should be appreciated that the controller 26 may be disposed at any location on or in the wind turbine 10, at any location on the support surface 14 or at any other suitable location. Generally, the controller 26 may be configured to control the various operating modes of the wind turbine 10 (e.g., start-up or shut-down sequences). Additionally, the controller 26 may control many of the various components of a wind turbine 10. For example, as the direction 30 of the wind changes, the controller 26 may be configured to control a yaw direction of the nacelle 16 about a yaw axis 28 to position the rotor blades 22 with respect to the direction 30 of the wind. In particular, the controller 26 may control a yaw drive mechanism (not illustrated) of the nacelle 16 in order to rotate the nacelle 16 about the yaw axis 28. Further, the controller 26 may control a pitch drive mechanism (not shown) in order to pitch the rotor blades 22 about a pitch axis 32.

Figure 2:
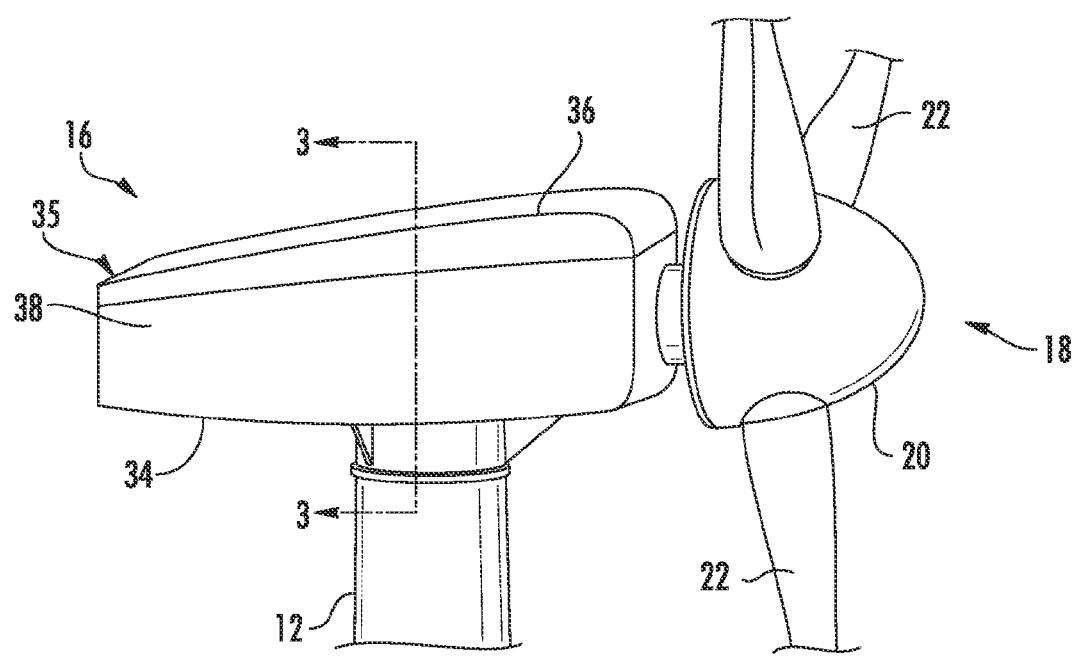
FIG. 2 illustrates is a perspective view of one embodiment of a nacelle according to the present disclosure.

Referring now to FIG. 2, a more detailed view of one embodiment of the nacelle 16 incorporating aspects of the invention is illustrated. In the illustrated embodiment, the nacelle 16 includes a shell body 35 having a base shell member 34 mounted atop the tower 12, a side shell wall 38, and a top shell member 36. It should be readily appreciated that the arrangement of side shell walls 38 and top shell member 36, as well as the configuration of the base shell member 34, may vary widely within the scope of the invention, and that the embodiment illustrated in FIG. 2 is for illustrative purposes only. Further, the base shell member 34 may be any assembly of structural elements that serve to support various components within the nacelle 16, as well as operationally configure the nacelle 16 on the tower 12. Moreover, any number and configuration of internal functional components may be supported by the base shell member 34. For example, yaw drives (not shown) may be supported by the base shell member 34 and may engage a gear mounted at the top of the tower 12 for yaw control of the rotor hub 18. Additional components supported by the base shell member 34 may include a generator, a gearbox, a pitch drive, an oil cooler, a hydraulic rotor brake, a control panel, and so forth. It should be readily appreciated that the shell body 35 may have any shape or size to accommodate any configuration of control or functional elements within the base section of the nacelle 16.

Figure 3:
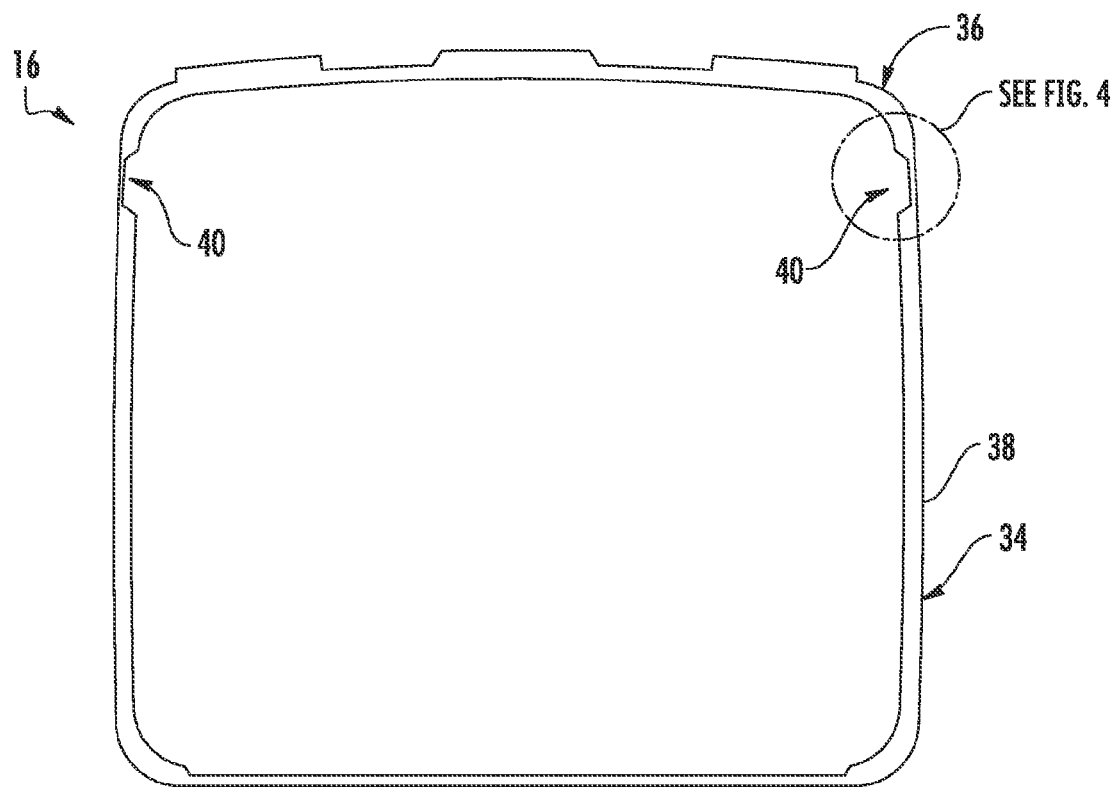
FIG. 3 illustrates a cross-sectional view of the nacelle of FIG. 2.
Figure 4:
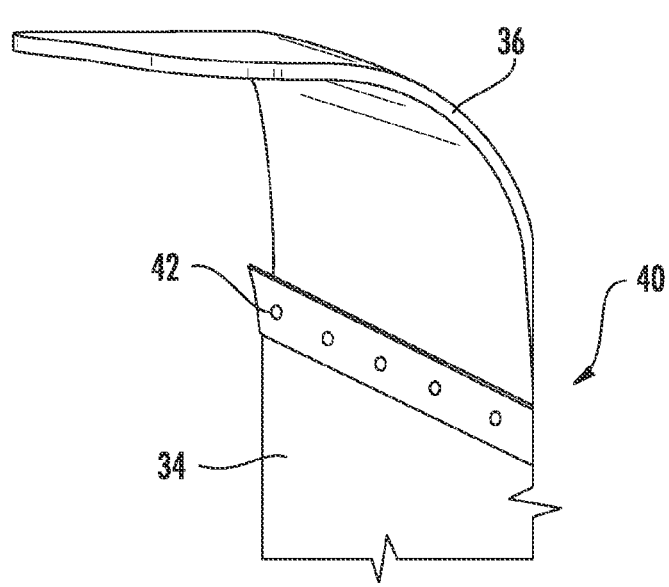
FIG. 4 illustrates a partial, detailed view of the embodiment of FIG. 3.
Figure 5:
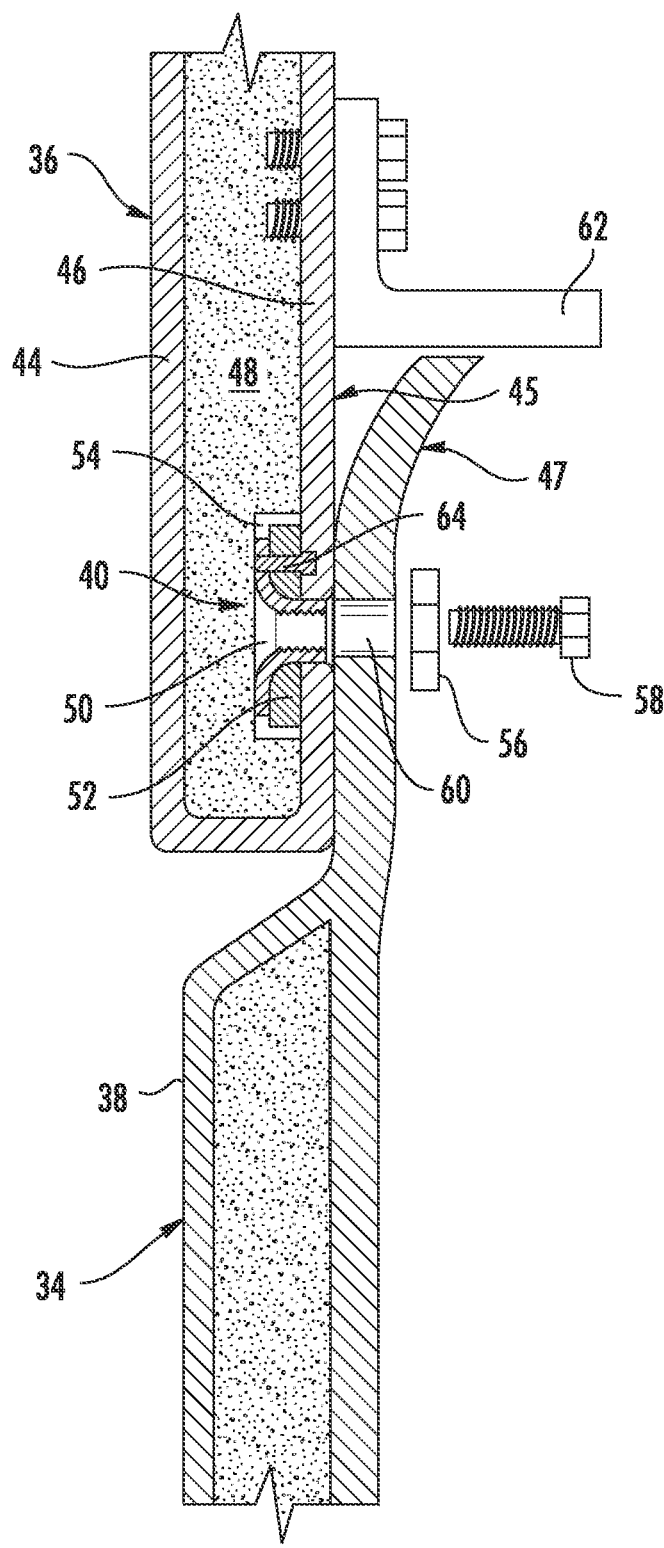
FIG. 5 illustrates a cross-sectional view of one embodiment of a joint assembly for a nacelle of a wind turbine according to the present disclosure.

More specifically, and referring now to FIGS. 3-5, a cross-sectional view of the nacelle 16 of FIG. 2 and a partial, detailed view of the nacelle 16 of FIG. 3 are illustrated, respectively. As shown particularly in FIG. 3, the base shell member 34 includes side shell wall 38. Further, the top shell member 36 is configured atop the side shell wall 38 via joint assembly 40. In addition, the joint assembly 40 includes one or more sandwich joints 42 configured to couple the base shell member 34 and the top shell member 36 as will be discussed in more detail later.

Referring to FIG. 5, the top shell member 36 includes a sandwich-panel configuration having a plurality of panel members 44, 46 surrounding a core structure 48. The base shell member 34 may also include a similar sandwich-panel configuration (as shown) or may include a single-panel configuration. In addition, the joint assembly 40 includes at least one female connection element 50 and at least one male connection element 58. For example, as shown particularly in FIGS. 6 and 7, the female connection element 50 may include a tee nut, a weld nut, or similar. More specifically, the female connection element 50 may include a flange 53 and an outwardly extending body 55, wherein the body 55 has a threaded internal hole or bore 57. Further, the male connection element 58 may include a threaded fastener, a bolt, a rivet, a dowel pin, or similar, configured to fit within the female connection element 50. At least a portion of the female connection element 50 fits within groove 54 of the core structure 48, whereas another portion of the female connection element 50 is embedded or molded within one of the panel members 44, 46. A flange 47 of the base shell member 34 aligns with and overlaps a flange 45 of the top shell member 36 such that the shell members 34, 36 may be joined together by joint assembly 40. More specifically, the flange 47 of the base shell member 34 may include a hole 60 that aligns with the embedded female connection element 50 when the flanges 45, 47 are aligned. As such, the male connection element 58 is configured to fit within the hole 60 of the base shell member 34 and into the female connection element 50 so as to couple the shell members 34, 36 together. In another embodiment, the top shell member 36 may also include a marker or indicator to indicate the location of the embedded female connection element 50. In yet a further embodiment, the joint assembly 40 may also include a washer component 56 that assists in distributing the load of the male connection element 58.

Figure 6:
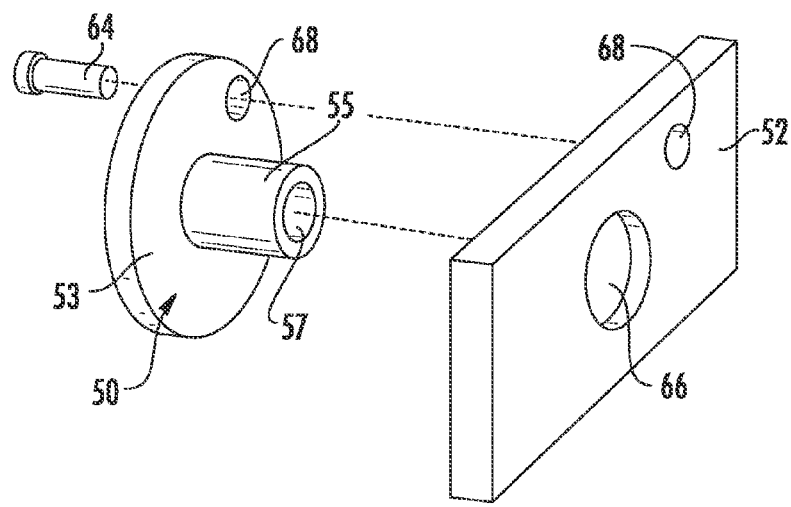
FIG. 6 illustrates an exploded view of one embodiment of various components of the joint assembly according to the present disclosure.
Figure 7:
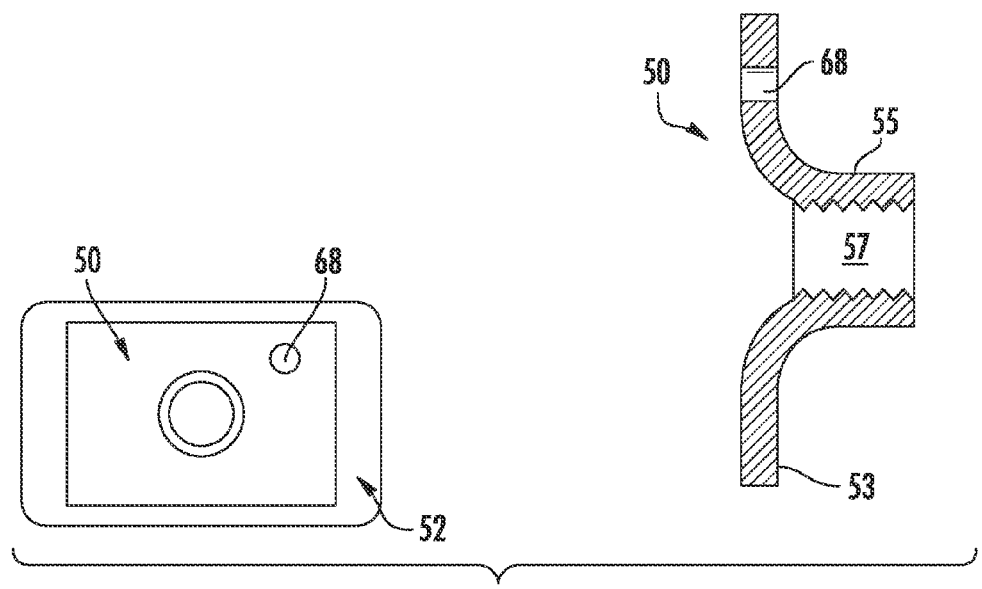
FIG. 7 illustrates a front view and side view of one embodiment of various components of the joint assembly according to the present disclosure.
Figure 8:
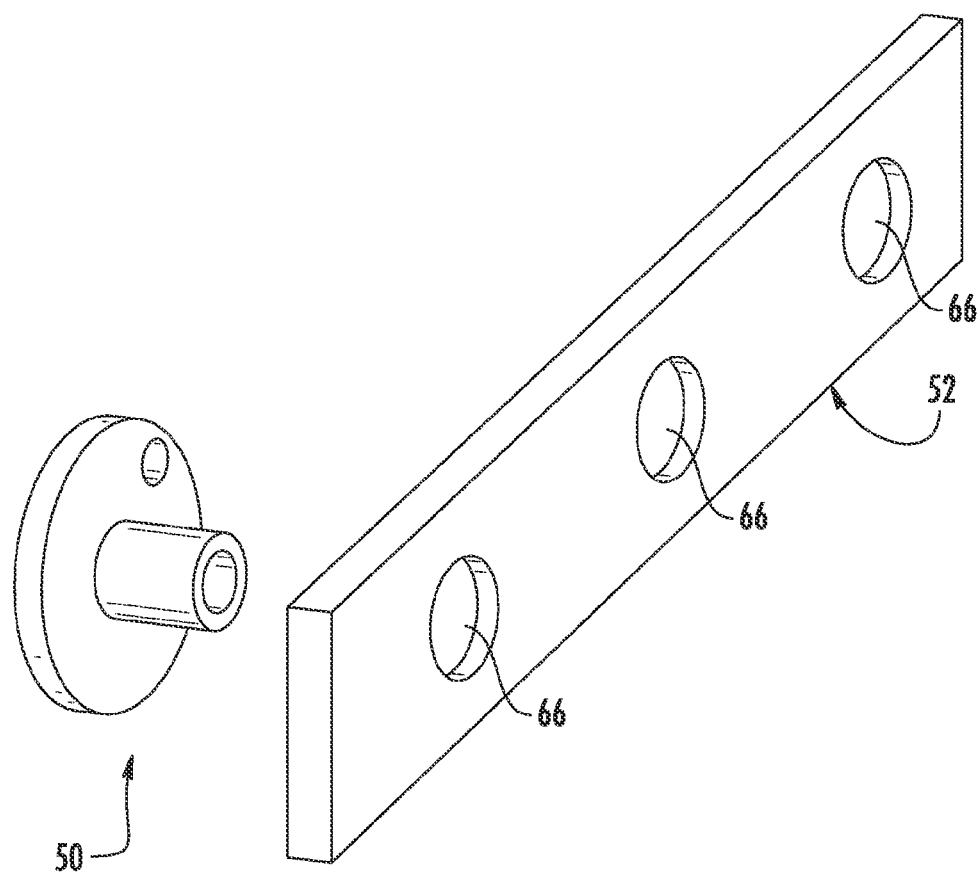
FIG. 8 illustrates another exploded view of one embodiment of various components of a joint assembly for a nacelle of a wind turbine according to the present disclosure.

Referring generally to FIGS. 5-9, the joint assembly 40 may also include an interior support plate 52 recessed within the core structure 48 between the female connection element 50 and one of the panel members 44, 46. The support plate 52 is configured to distribute the joint clamping force towards the exterior metal clamping washers. More specifically, referring to FIGS. 6 and 7, the support plate 52 may include at least one opening 66. As such, when the joint assembly 40 is assembled, the support plate 52 fits within the groove 54 of the core structure 48 and the body 55 of the female connection element 50 fits within the opening 66 of the support plate 52 and through one of the panel members 44, 46. It should be understood that the support plate 52 may be configured to accommodate any number of female connection elements 50. For example, as shown in FIG. 6, the support plate 52 includes one opening 66 to accommodate one female connection element 50. In an alternative embodiment, and referring particularly to FIG. 8, the support plate 52 may include a plurality of openings 66, e.g. three openings 66, configured to engage a plurality of female connection elements 50 recessed within the core structure 48.

Referring particularly to FIGS. 5 and 6, the joint assembly 40 may also include one or more rivets 64 configured with the female connection element 50 and the support plate 52. The rivet(s) 64 is configured to prevent rotation between the female connection element 50 and the support plate 52. More specifically, the rivet(s) 64 may be inserted within the rivet hole 68 of the female connection element 50 and through the corresponding rivet hole 68 of the support plate 52. Thus, the connected components may be inserted into the groove 54 of the core structure 48 before the outer panel members 44, 46 are molded thereto. Once the panel members are infusion-molded to the core structure 48, the components are molded within the sandwich-panel configuration to provide an internal joint assembly 40.

Still referring to FIG. 5, the joint assembly 40 may include one or more L-supports 62 configured with the base shell member 34 and the top shell member 36 so as to provide support and/or alignment to the joint assembly 40 during final assembly. For example, as shown, the L-support 62 is installed to the top shell member 36 so as to sit atop the base shell member 34 when properly aligned. As such, the L-support(s) 62 assists in properly aligning the top shell member 36 with the base shell member 34 when the top shell member 36 is removed and reinstalled.

Figure 9:
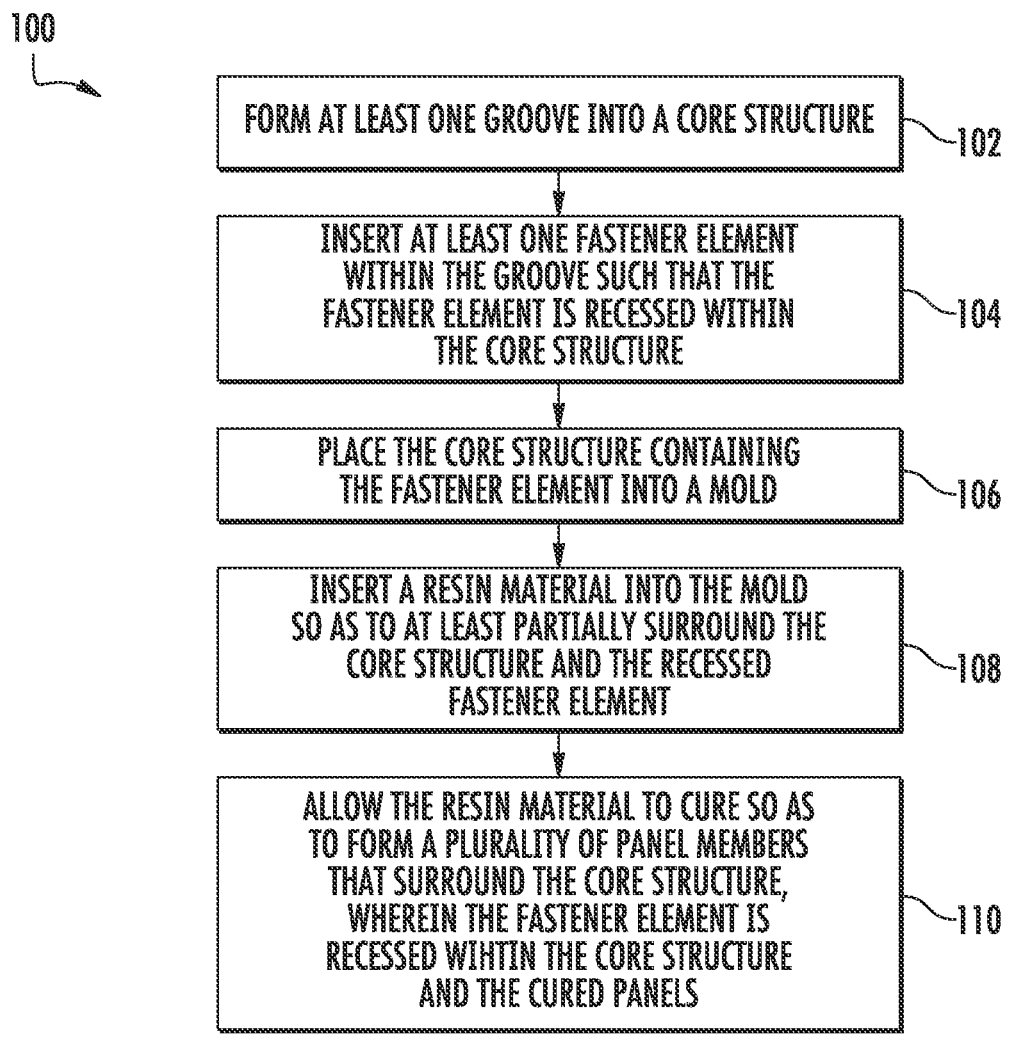
FIG. 9 illustrates a method of manufacturing a sandwich panel joint assembly according to the present disclosure; and, FIG. 10 illustrates a cross-sectional view of one embodiment of a sandwich panel joint assembly during the manufacturing process according to the present disclosure.
Figure 10:
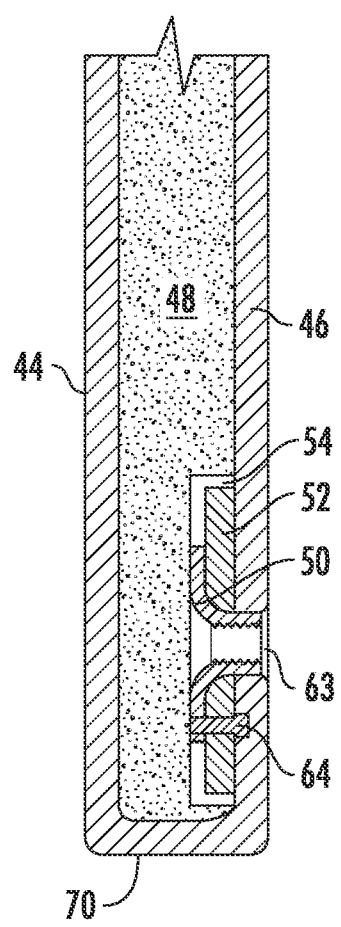

Referring now to FIG. 9, a method 100 of manufacturing a sandwich panel particularly useful for joining shell members of a wind turbine is disclosed. FIG. 10 illustrates a cross-sectional view of one embodiment of a sandwich panel joint assembly 40 during the manufacturing process. The method 100 includes a first step 102 of forming at least one groove or recessed area into a core structure. A next step 104 includes inserting at least one fastener element within the groove such that the fastener element is recessed within the core structure. The method 100 also includes a step 106 of placing the core structure containing the fastener element into a mold. A next step 108 includes inserting a resin material into the mold so as to at least partially surround the core structure and the recessed fastener element. In one embodiment, wherein the sandwich panel is formed from a fiberglass matrix composite, the step of inserting the resin material into the mold so as to at least partially surround the core structure and the recessed fastener element further includes layers of glass fabric mats and layers of non-woven polypropylene flow media (PP). In a further embodiment, the method 100 may include applying a vacuum to the mold so as to assist with inserting the resin material into the mold. More specifically, the method 100 may include covering and sealing the mold with a vacuum bag, e.g. at a bag surface 70, applying a vacuum within the vacuum bag so as to assist with inserting the resin material into the mold, and injecting the resin material into the vacuum bag so as to fill the mold. The resin material is then allowed to cure so as to form a plurality of panel members that surround the core structure (step 110). In one embodiment, the panel members are manufactured using a fiberglass matrix composite. Thus, the fastener element(s) may be casted into the composite matrix of the resin material and glass mats in its final state. As such, the manufactured sandwich panel includes the fastener element recessed within the core structure and molded into one of the cured panels.

In still another embodiment, the method may include installing a cover 63 to the fastener element (e.g. the female connection element) before the step of inserting a resin material into the mold so as to prevent the resin material from entering the female connection element during insertion of the resin material. More specifically, the cover 63 may include at least one of a plastic, threaded fastener, a cap, tape, or similar.

In yet another embodiment, the step 102 of forming at least one groove into the core structure may further include manually cutting the groove in the core structure. In another embodiment, the step 102 of forming at least one groove into the core structure may further include machining the groove into the core structure. For example, in a particular embodiment, the groove may be cut into the core structure using computer numerical control (CNC) machining or any other suitable machining process.

It should be understood that the core structure 48 as described herein may include any suitable filler material known in the art. For example, in one embodiment, the core structure includes any one of or combination of the following: polyethylene terephthalate, polyvinyl chloride, polyurethane, polyisocyanurate, or similar. Similarly, the resin material may be any suitable material so as to manufacture the sandwich panel according to the methods described herein. For example, in one embodiment, the resin material may include any one of or combination of the following: polyesters, vinyl esters, polyurethanes, phenolics, epoxies, or similar.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A nacelle for a wind turbine, the nacelle comprising:
a base shell member configured for mounting atop a tower of the wind turbine, said base shell member comprising a side shell wall;
a top shell member configured atop said side shell wall, said top shell member comprising at least one sandwich panel, said sandwich panel comprising a plurality of panel members surrounding a core structure; and,
a joint assembly coupling the top shell member to the base shell member, said joint assembly comprising at least one female connection element and at least one male connection element, the female connection element being at least partially recessed within the core structure of the top shell member and molded into one of the panel members,
wherein the male connection element engages the female connection element so as to couple the base shell member to the top shell member.

2. The nacelle of claim 1, wherein the female connection element further comprises a tee nut, the tee nut comprising a flange and an outwardly extending body, wherein the body comprises a threaded internal hole.

3. The nacelle of claim 1, wherein the male connection member comprises at least one of a threaded fastener, a rivet, or a dowel pin.

4. The nacelle of claim 1, further comprising a support plate recessed within the core structure between the female connection element and one of the panel members, wherein the support plate comprises at least one opening, wherein a body of the female connection element is inserted into the opening of the support plate and through one of the panel members.

5. The nacelle of claim 1, wherein the joint assembly further comprises one or more L-supports configured with the base shell member and the top shell member, the L-supports configured to provide support to the joint assembly during installation.

* * * * *